(12) United States Patent
Parsons

(10) Patent No.: US 12,188,229 B2
(45) Date of Patent: Jan. 7, 2025

(54) TILE SYSTEMS

(71) Applicant: Versoflor Ltd, Whetstone (GB)

(72) Inventor: Darren Parsons, Whetstone (GB)

(73) Assignee: Versoflor Ltd, Whetstone (GB)

( * ) Notice: Subject to any disclaimer, the term of this patent is extended or adjusted under 35 U.S.C. 154(b) by 188 days.

(21) Appl. No.: 17/858,671

(22) Filed: Jul. 6, 2022

(65) Prior Publication Data

US 2022/0341163 A1    Oct. 27, 2022

Related U.S. Application Data

(63) Continuation of application No. PCT/EP2021/050307, filed on Jan. 8, 2021.

(30) Foreign Application Priority Data

Jan. 10, 2020   (GB) .................................... 2000343

(51) Int. Cl.
*E04B 5/48*    (2006.01)
*E04F 15/02*    (2006.01)

(52) U.S. Cl.
CPC ................ *E04B 5/48* (2013.01); *E04F 15/02* (2013.01)

(58) Field of Classification Search
CPC ...... E04B 5/48; E04F 15/02; E04F 15/02194; E01C 9/08; E01C 9/086; E01C 5/20; E01C 11/265; E01C 13/02; E01C 13/045; E01C 17/00; E01C 2201/06; E01C 2201/12; E01C 2201/16

See application file for complete search history.

(56) References Cited

U.S. PATENT DOCUMENTS

| | | | |
|---|---|---|---|
| 4,930,286 A * | 6/1990 | Kotler | E01C 13/045 428/44 |
| 5,639,531 A | 6/1997 | Chen et al. | |
| 2013/0276399 A1 | 10/2013 | Rapaz | |
| 2016/0222674 A1 * | 8/2016 | Cerny | E04F 15/105 |

FOREIGN PATENT DOCUMENTS

| | | |
|---|---|---|
| EP | 2615220 A2 | 7/2013 |
| FR | 3031999 A1 | 7/2016 |
| GB | 2568614 A | 5/2019 |
| GB | 2569385 A | 6/2019 |
| KR | 20060074940 A | 7/2006 |
| KR | 101137235 B1 | 4/2012 |
| KR | 101351442 B1 | 1/2014 |
| KR | 101865706 B1 | 6/2018 |
| NL | 8403764 A | 7/1986 |
| WO | WO 2015/061894 A1 | 5/2015 |
| WO | WO 2019/093893 A1 | 5/2019 |

* cited by examiner

*Primary Examiner* — Mark R Wendell
(74) *Attorney, Agent, or Firm* — Reinhart Boerner Van Deuren P.C.

(57) ABSTRACT

A tile, which may be a component of a modular flooring system, includes a plurality of cells on its underside, adjacent cells being interconnected to form two sets of channels parallel to the upper surface and open to the underside of the tile. The tile may have recesses in its upper surface, into which inserts can be pressed to form a decorative pattern. The channels may be used as ducting for cables under the floor surface. The cables can be held in place by clips that bridge between a pair of the cells. The cables may include a lighting cable, which can be arranged to transmit light to the upper surface of the tile through inserts that are translucent.

20 Claims, 5 Drawing Sheets

TILE SYSTEMS

CROSS-REFERENCE TO RELATED PATENT APPLICATIONS

This patent application is a continuation of International Application No. PCT/EP2021/050307, filed on Jan. 8, 2021, which claims the benefit of priority to United Kingdom Patent Application No. 2000343.0, filed Jan. 10, 2020, the entire teachings and disclosures of both applications are incorporated herein by reference thereto.

DESCRIPTION

Technical Field

The invention relates to interlocking tiles for covering a surface of a building, structure or outdoor area. The surface is typically a floor and the tiles may be used as an easy way to change its appearance or its physical characteristics such as the surface material. The use of the tiles may be temporary, e.g. in a display area, or of unlimited duration, e.g. around a swimming pool or in a garage.

Background

Interlocking modular panels are well known as temporary ground coverings, for example to create temporary dance floors or routes for vehicles to travel across soft ground. They can also be put to more permanent use, e.g. to install wood flooring or to create a raised floor with a void underneath, which can be used for routing electrical or telecommunications cables. When used on a floor, such systems generally do not need to be fixed down: they can "float" and their own weight combined with engagement with the adjoining panels is sufficient to hold them on the substrate. Modular panel systems have the advantage of being relatively quick to install as a way of changing the appearance or physical characteristics of the floor, without the need to remove and replace the existing ground surface. They are also generally quick to remove when a temporary installation comes to an end or if access is needed to the ground below a permanent installation.

There has been little use of such interlocking modular technology in applications for which ceramic or stone tiles are more traditionally used, for example in swimming pool surrounds. One reason may be that if the individual tiles are smaller, more of them are required, so the installation becomes more time-consuming and, with a greater number of connections each offering a small amount of play, the stability of the final construction is reduced. While larger tiles or panels could be used in these situations, their uniform appearance gives little scope for the creation of interesting designs and may detract from the appearance of the finished floor surface.

SUMMARY

The invention provides a tile system according to embodiments of the present disclosure.

The ability to lay cables under the tiles provides advantages: for example, to provide power or networking to equipment that may be placed on the tile assembly without creating a trip hazard. Because there are two sets of channels, which are typically orthogonal and intersecting, cables can be guided through the tile along many different paths. Special cables can be used to add lighting or to heat the tile assembly itself from below. In embodiments of the invention where a lighting cable under the tiles lights the floor surface through translucent inserts, it will be understood that this can be a cost-effective way to provide floor-level lighting for use in emergency situations.

The invention further provides an alternative tile system according to embodiments of the present disclosure.

The tiles according to the invention may be made large enough to be quick and easy to install and to form a robust and stable structure, while retaining the freedom to create an enormous variety of decorative patterns, depending on how the inserts are arranged in the recesses. For example, if the recesses are arranged in a grid pattern over substantially the whole surface of the tile, the inserts can be arranged in the manner of a mosaic.

It will be understood that the patterns formed by the inserts need not be purely decorative: for example, in some situations they could be used to define a route, form a directional indicator or highlight a hazard.

The invention additionally provides a method of assembling a tile system according to embodiments of the present disclosure.

The dependent claims define features of the invention that are preferred but not essential.

In this specification, words such as "lower" and "under" refer to the direction towards the substrate on which the tile is mounted, while words such as "upper" and "over" refer to the opposite direction. These words therefore have their natural meaning when the substrate is a floor but the invention does not exclude mounting the tiles on substrates with other orientations, e.g. on a wall. Naturally, the tiles and other components of the invention may be manufactured, transported and stored in any orientation prior to use, without departing from the scope of the invention defined by the claims.

DETAILED DESCRIPTION

Figure 1:
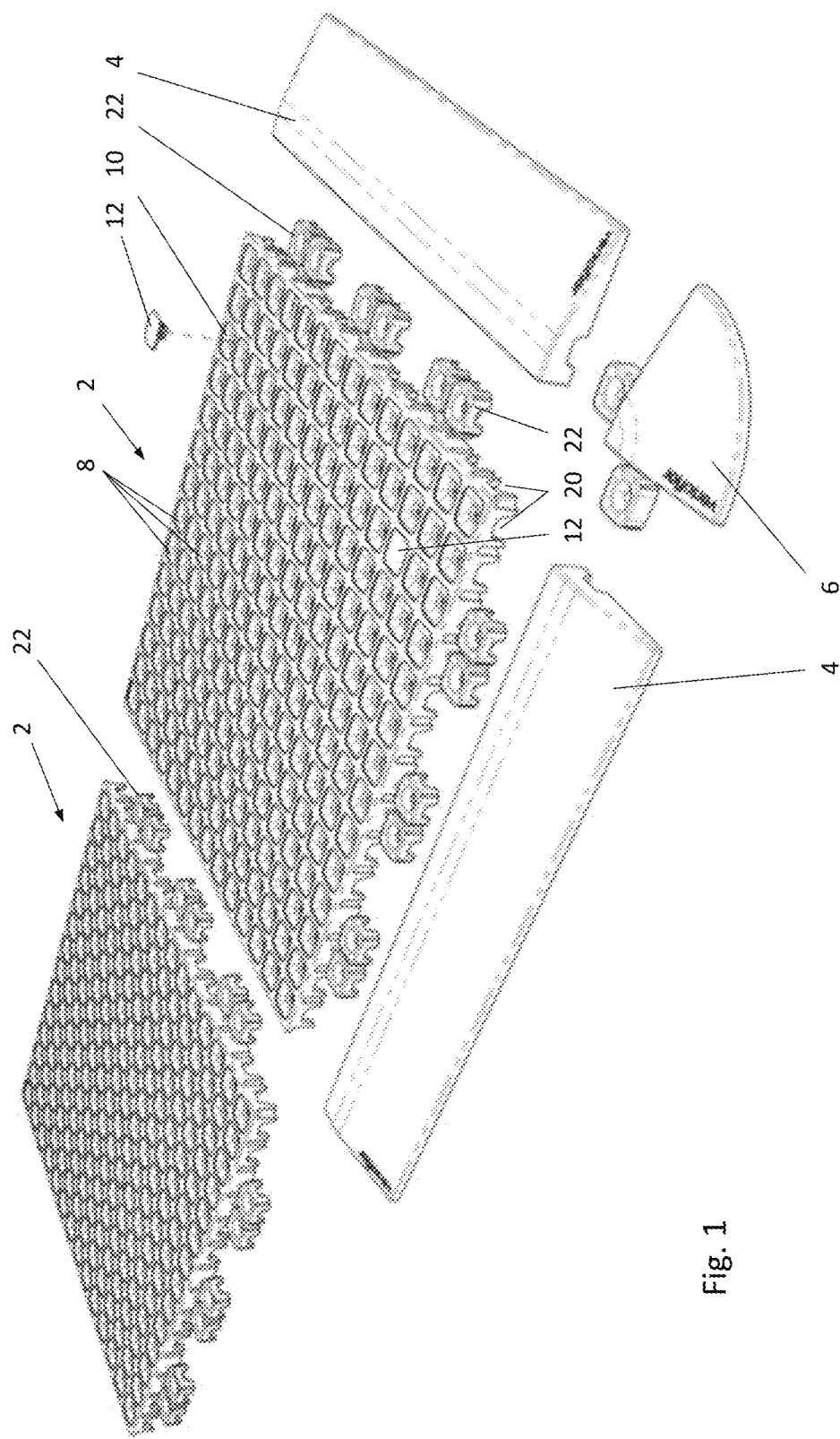
FIG. 1 is a perspective view showing the components of a tile assembly in accordance with the invention.

FIG. 1 illustrates various components of a modular tile assembly according to a first embodiment of the present invention. The assembly is intended to be laid on a flat substrate, such as a cement screed, to form a floor just above the substrate.

The main area of the floor is constructed from a plurality of interlocking tiles 2. In this embodiment the tiles 2 are square in plan, though other tessellating shapes such as rectangles, hexagons or a combination of two or more different shapes could be used. The design of the illustrated tile 2 is such that it can be moulded as a single component in a two-part mould. The tiles are preferably formed from a plastic material, such as polypropylene, that is strong enough to carry the weight that is expected to be placed on the floor and hard enough to resist the wear of the activities that are expected to be carried out on it. For example, if vehicles are to be driven over the floor, it may need to be of a more robust material and/or design than for purely pedestrian use. Naturally, other considerations such as colour, grip, weather-resistance, sustainability, etc. may affect the choice of material.

The tiles 2 are designed to interlock with one another so that they can cover an indefinite area of the substrate in modular fashion. As shown in FIG. 1, the main tiles 2 may also interlock with edge pieces 4 and corner pieces 6 at the edges of the desired area of floor.

Figure 2:
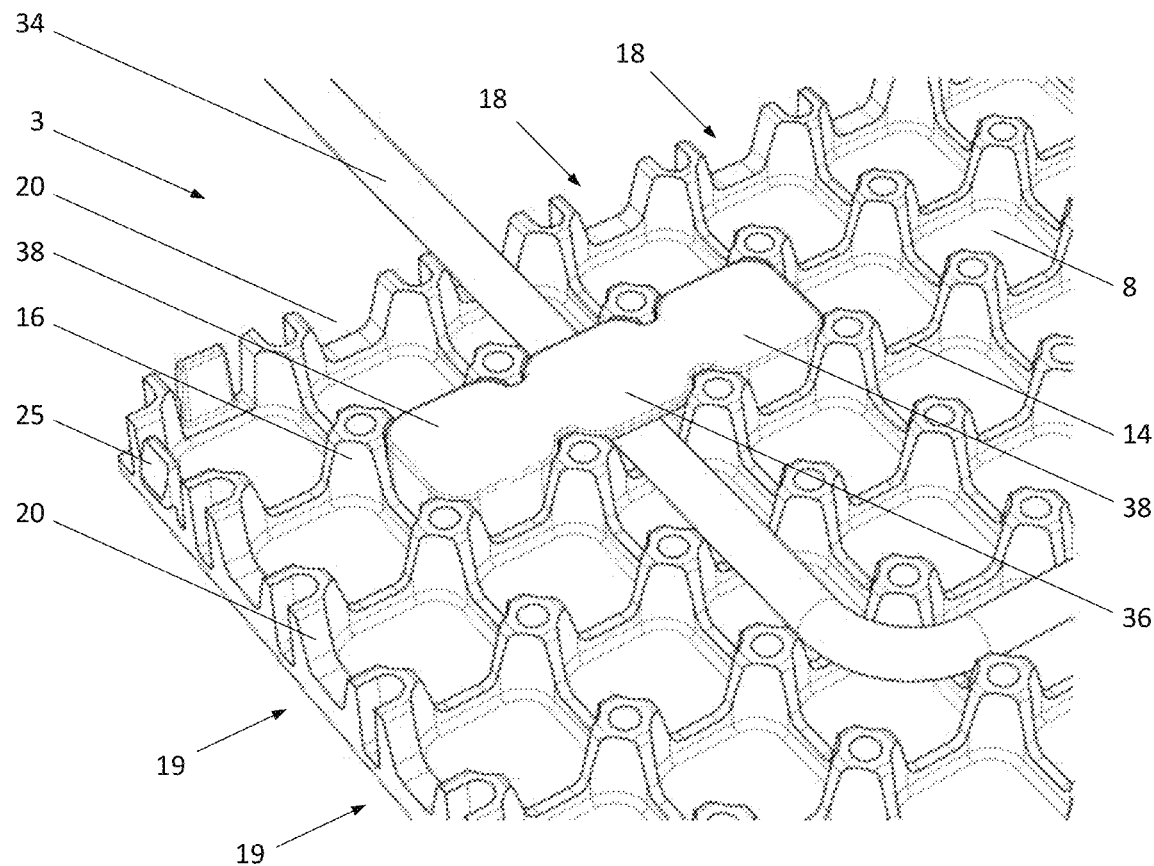
FIG. 2 is a perspective view of part of the underside of a tile that may be used with the present invention, illustrating a cable clip in accordance with the invention.

Each tile 2 is formed as a single moulding, structured as a grid of square cells 8, which in the illustrated embodiment form a 14×14 array. In accordance with the invention, at least some of the cells 8 provide recesses 10 in the upper surface of the tile 2, into which inserts 12 can be pressed to form a desired pattern, as will be described in more detail below. In the illustrated embodiment of the invention, every cell 8 has such a recess 10, although FIG. 1 shows only one representative cell 8 that is occupied by an insert 12. Alternatively, smaller numbers of recesses 10 could be provided: for example, spread more sparsely over the whole area of the tile 2, confined to particular areas of the tile or arranged in pre-defined patterns. In regions of the flooring where no surface pattern is required, plain tiles with no recesses may be used alongside tiles according to the invention. The underside of such a plain tile 3 is shown in FIG. 2. Apart from the absence of recesses 10, the structure of the plain tile 3 is substantially the same as that of the tiles 2 according to the invention so FIG. 2 is useful for understanding both kinds of tile.

As seen in FIG. 2, the underside of each cell 8 is substantially hollow. The walls between adjacent cells 8 take the form of arches 14, which spring from pillars 16 located at each intersection of the grid. The array of pillars 16 supports the floor above the substrate on which it rests. The lines of arches 14 along each row and column of the grid of cells 8 create first and second sets of channels 18 that open to the underside of the tile 2. The channels 18 extend parallel to the upper surface of the tile and at least some of the channels 18 emerge at openings 20 in the side edges of the tile. For a square or rectangular tile 2, as illustrated, the first and second sets of channels 18 are orthogonal to one another and each cell 8 is located at the intersection of two channels 18. A system with hexagonal tiles (not illustrated) might comprise three sets of channels and each cell would be located at the intersection of three channels angled at 60° to one another.

Figure 3:
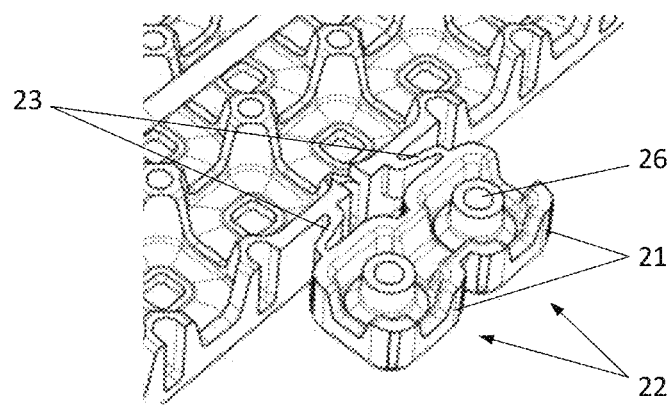
FIG. 3 is a perspective view of part of the underside of a tile in accordance with the invention, illustrating engagement means for connecting adjacent tiles.

Around the edges of the tiles 2,3, engagement means are provided for securing each tile to adjacent, similar tiles. The engagement means may take various forms but a mechanical interlock between adjacent tiles is preferred. As seen in FIG. 3, the engagement means typically comprise projections 22 that extend from edges of the tile 2. In the embodiment of the invention illustrated in FIG. 1, each projection 22 has a substantially square boss 21 that fits into the hollow underside of a cell 8 of the adjacent tile. The boss 21 is connected to the tile 2 by a narrow flexure 23, which will fit through one of the arched openings 20 at the end of a channel in the side edge of the adjacent tile. The illustrated projections 22 are in adjacent pairs, spaced at intervals along two neighbouring side edges of the tile 2. The bosses 21 of the adjacent projections 22 are joined to one another such that, in the assembled floor, the two bosses 21 will fit respectively in two adjacent cells 8 and the part joining them will pass through the arch 14 between the two cells 8. Seen in plan view, the flexures 23 of the adjacent projections 22 are configured as mirror-image S-shapes. This permits some movement of the projections 22 parallel to the plane of the tile and reduces the likelihood of damage in the event that the tile is subjected to torsion, for example by a vehicle turning on it. The flexures 23 can also move to accommodate thermal expansion of the tiles 2.

During assembly of a floor, the edge of each new tile is lowered over the engagement means 22 that project from a tile 2 already in place. The boss 21 is a push-fit into the cell 8 and assembly does not require a hammer or any other tool. In order that the new tile cannot simply be lifted off again, small retaining hooks 25 may be provided on the two side edges of each tile 2 that do not carry the engagement means 22. When the new tile is pushed fully into place, its retaining hooks 25 catch under channel openings 20 of the existing tile 2 to hold the new tile down in a releasable manner. The bosses 21 of the engagement means 22 may be provided with countersunk screw-holes 26, through which the tiles 2 can be secured to the substrate if required. This may be appropriate if the tiling system is installed on a vertical surface or if there is concern that in some areas it might lift from the substrate.

Many alternative arrangements of the engagement means are possible, provided that each projection 22 is matched by a complementary opening 20 in the corresponding position in the opposite edge of the tile 2. It is preferred that some of the channels 18 are kept clear of engagement means, in order that each such channel can provide a straight path through the underside of the tile 2 between the openings 20 at its ends.

Because of the repeating pattern of cells 8 on the underside of the tiles 2,3, a tile may be cut along certain lines parallel to its side edges so as to leave a whole number of cells 8 remaining. The line of arches 14 exposed by the cut form new end openings 20 of the channels 18, which can receive the engagement means 22 of an adjacent tile and thus secure the cut tile to the floor in the same way as a whole tile.

Figure 4:
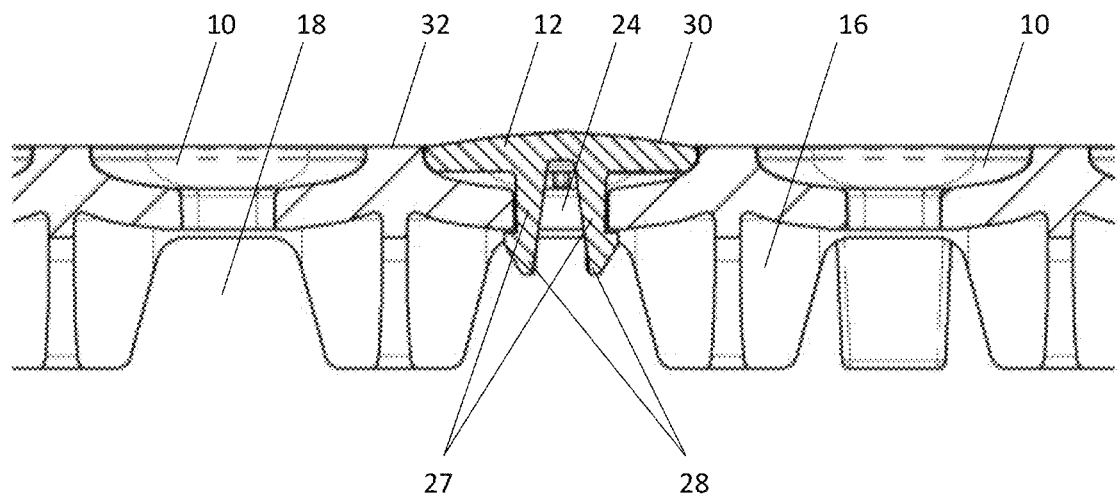
FIG. 4 is a cross-section through part of the tile assembly of FIG. 1, showing an insert located in a recess of the tile.

FIG. 4 is a cross-section through part of a tile 2, which shows how an insert 12 can be received and retained by one of the recesses 10. At the base of each recess 10 is a hole 24 through to the underside of the tile 2. The shape of each insert 12 complements the shape of the recess 10. At the bottom of the insert is a pair of downwardly projecting arms 27, which engage the hole 24 in snap-fit connection. The arms 27 end in a pair of hooks 28 that face away from one another. In the relaxed state of the arms 27, the hooks 28 are too wide to fit through the hole 24 but the leading faces of the hooks 28 are tapered to guide them into the hole 24 and to urge the arms 27 to bend towards one another. When the insert 12 is fully inserted into the recess 10, the hooks 28 clear the bottom of the hole 24, allowing the arms 27 to spring resiliently apart. The hooks 28 then catch behind the bottom wall of the recess 10 to prevent the insert 12 being accidentally removed again. The arms 27 and the hole 24 may be configured so that it is possible to remove the inserts, for example using a special tool, or so that it is impossible to remove them without lifting the tile 2 to get access to the underside.

The inserts 12 may be formed from the same material as the tile 2 or from a different material to provide different characteristics. They will generally be of one or more colours that are different from the tile 2 and it will readily be understood from FIG. 1 how an arrangement of multiple inserts 12 over the array of recesses 10 can be used to build up a mosaic in any desired pattern. The inserts 12 are normally shaped so that their upper face 30 is flush with the upper surface 32 of the tile 2 but, as seen in FIG. 4, there may be circumstances in which a shallow domed profile is desirable, e.g. to provide increased grip on the floor surface. The upper face of at least some inserts could be textured for the same purpose. Some inserts could be shaped such that after insertion they create a fluid passage through the recess 10—either through the body of the insert or around its outside—to provide drainage from the upper face of the tile 2. In many cases, it will be acceptable to leave some of the recesses 10 unfilled by inserts 12 so that the holes 24 provide drainage from the upper face of the tile and air circulation to the substrate below the tile.

Reverting to FIG. 2, this illustrates how a cable 34 may be ducted under the tile 2 through the channels 18 formed by rows or columns of cells 8 interconnected by arches 14. This is a convenient way to deliver electric power, networking or telecommunications services to apparatus that may be provided on the floor or on adjacent walls; or simply as a way for the cable 34 to cross the floor without creating a trip hazard. As shown, if the cable is sufficiently flexible, it can change direction through 90° from one channel to a crossing channel and, with careful design of the layout, multiple cables may be accommodated. The cable 34 can be held in place by a removable clip 36, which bridges across the channel 18 in which the cable 34 has been laid. Each end of the clip 36 comprises a foot 38, which is shaped to be a push-fit into the adjacent hollow cell 8 on each side of the channel 18.

Figure 5:
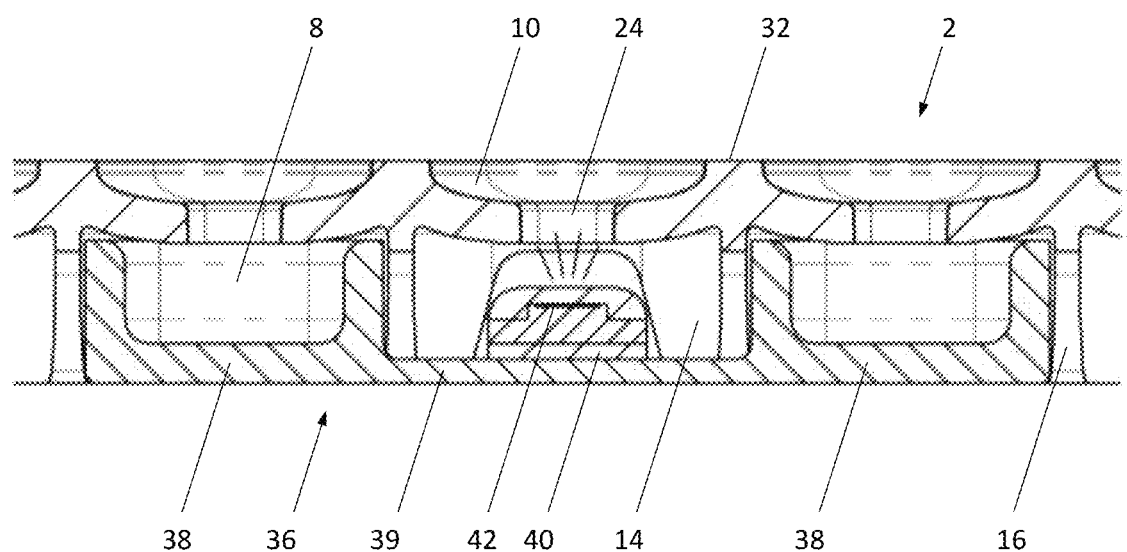
FIG. 5 is a cross-section through part of the tile assembly of FIG. 1, showing the use of a cable clip to secure a lighting cable.

FIG. 5 is a partial cross-section showing the same arrangement, in which a cable is held in a channel 18 by a clip 36 that is anchored in adjacent cells 8 on each side. The cable in FIG. 5 is a particular instance, namely a lighting cable 40, which has lighting elements 42 such as LEDs spaced at intervals along its length. Preferably, the lighting elements 42 are spaced at intervals that are a multiple of the spacing between cells 8 of the grid, whereby it can be arranged that successive lighting elements 42 are aligned with recesses 10. Those recesses 10 can be left open or filled with translucent inserts 12—either clear or coloured—to allow light from the lighting elements 42 to reach the upper surface 32 of the tile for decorative and/or practical purposes. In plain tiles 3 or in regions of a normal tile 2 that lack recesses, the floor surface itself may be made sufficiently thin above some or all of the cells 8 that it becomes translucent to light emitted by a lighting cable 40 below the tile.

Figure 6:
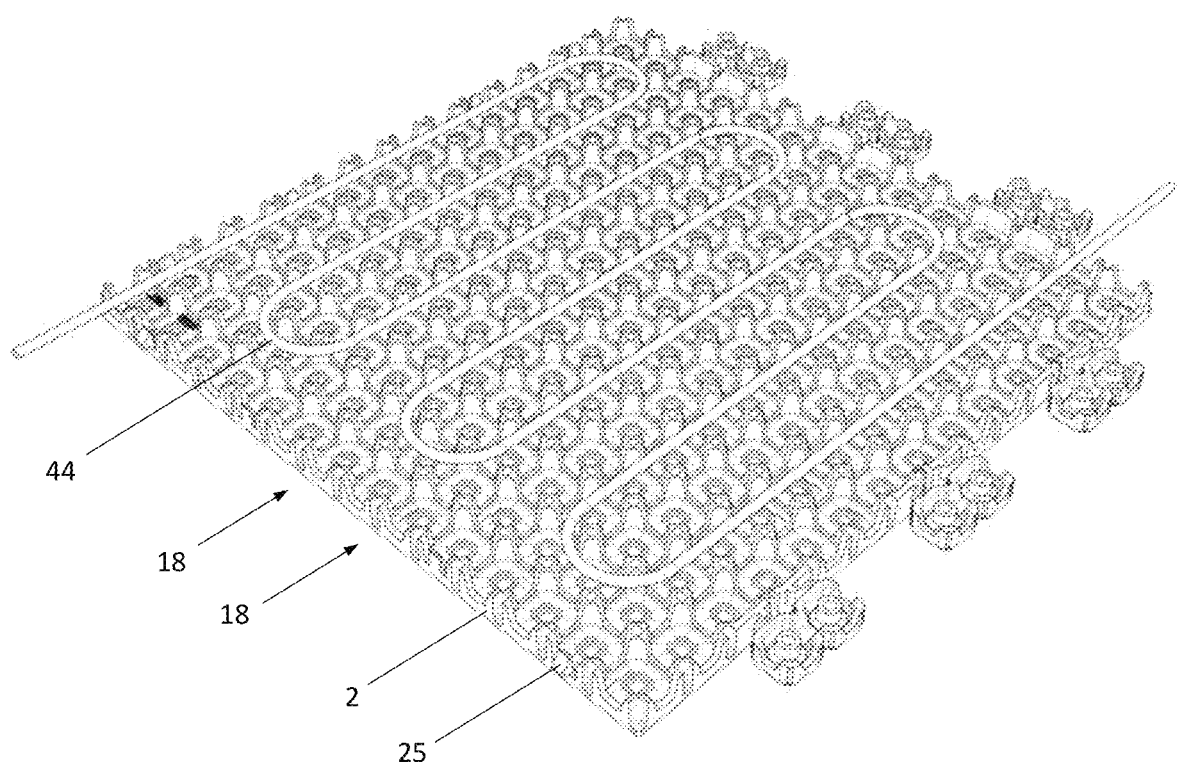
FIG. 6 is a perspective view of the underside of a tile in accordance with the invention, showing its use with a heating cable.

FIG. 6 illustrates another type of cable that may be ducted beneath a tile 2 according to the invention, namely a heating cable 44. The cable 44 carries electrically resistive heating elements (not shown), either continuously or at intervals along its length, from which heat can be conducted through the tile to warm the surface of the floor. Arranging the cable 44 in the serpentine manner shown ensures that the heat is evenly distributed across the area of the tile 2. Cable clips 36 (not shown in FIG. 6) could again be used to secure the heating cable in position.

Figure 7:
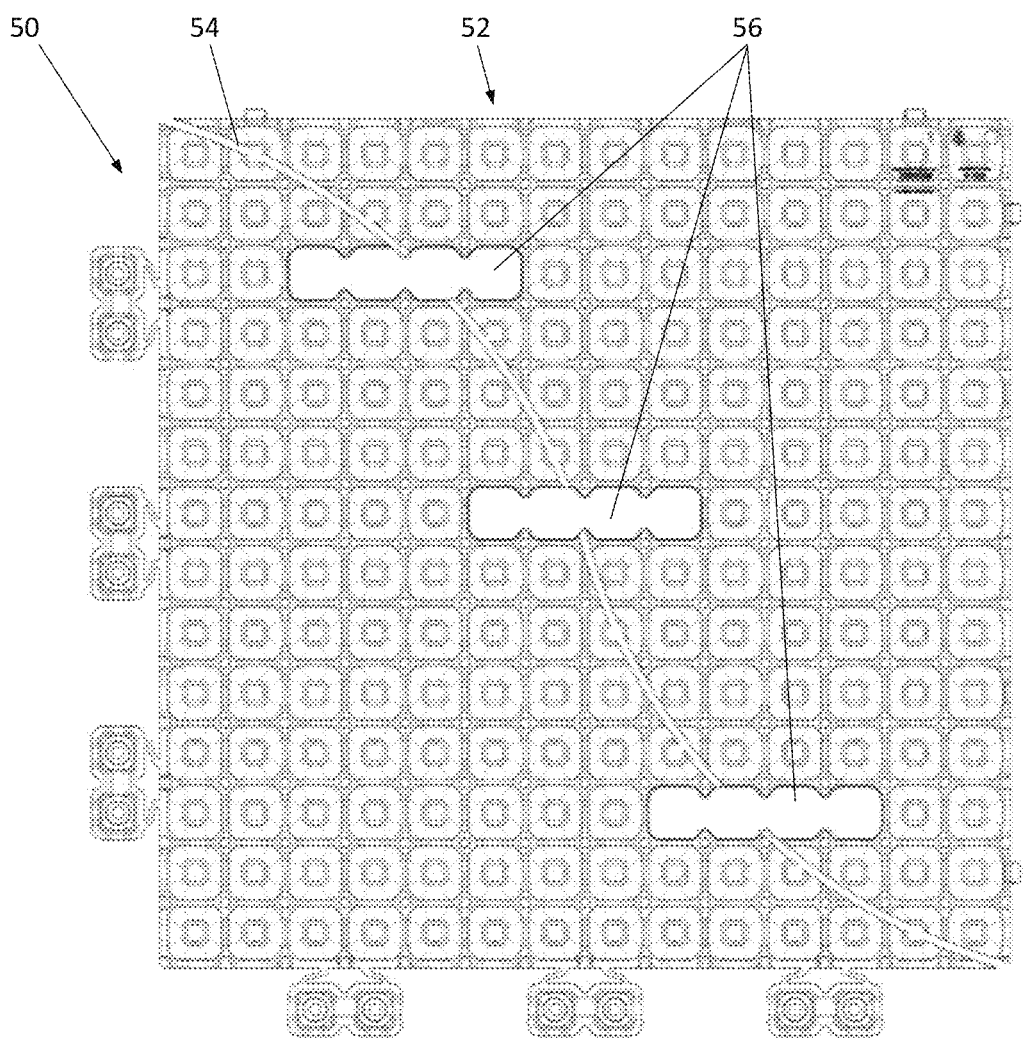
FIG. 7 is a plan view of two tile parts in accordance with the invention, which have been secured together by junction clips.
Figure 8:
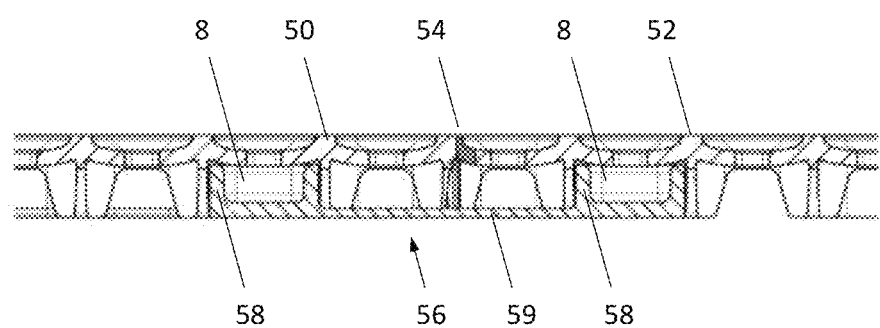
FIG. 8 is a partial cross-section of FIG. 7, taken along the length of one of the junction clips.

FIGS. 7 and 8 show an example of how the tiling system can be made to provide still more flexible designs by combining cut tile parts of different colours. The tile parts 50,52 may be parts of plain tiles 3 or of normal tiles 2 that have recesses 10. In this example, a single tile is replaced by two complementary parts 50,52 of tiles according to the invention, which have been cut along a curved line 54. The two parts 50,52 are secured together by a series of junction clips 56, which bridge the cut line 54. The junction clips 56 are very similar to the cable clips 36, having a foot 58 at each end that is a push-fit into a cell 8 on the underside of the respective tile part 50,52. However, in this case the junction clip 56 preferably bridges across two intermediate cells 8 to allow room for an oblique cut line 54 that crosses two cells (as seen near the bottom of FIG. 7). When joined together, the tile parts 50,52 form the same overall shape as a whole tile 2,3 and they can be used in the same manner as a whole tile when assembling a floor.

The reader will understand that various features of the described embodiment of the invention could be used independently of one another. In particular, the operation of the engagement means 22 for securing adjacent tiles together does not depend in any way on the tiles having recesses 10 and inserts 12 in the upper surface (or vice versa).

The reader will also understand that the inventive concept set out in this specification encompasses numerous variants of the particular embodiments described. For example, instead of the described snap-fit connection between the inserts 12 and the recesses 10, there could be a simple push fit or interference fit connection. Alternatively, a second component could be attached to the insert from the underside of the tile to prevent the insert being withdrawn from the recess.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A tile system comprising at least one tile having an upper surface, an underside and a plurality of side edges, wherein:
   the underside of the tile comprises a plurality of cells, adjacent cells being interconnected to form a plurality of channels parallel to the upper surface, wherein the channels open away from the upper surface and at least some of the channels end in openings at the side edges of the tile;
   the channels comprise a first set of channels that extend between one pair of opposite side edges and a second set of channels that extend between a second pair of opposite side edges;
   at least one of the side edges comprises one or more projections suitable for securing the tile to an adjacent, similar tile; and
   each projection comprises a flexure that extends from the side edge of the tile and terminates in a boss, the flexure extending into an opening at a side edge of the adjacent tile, and the boss fitting into a cell on the underside of the adjacent tile.

2. The tile system according to claim 1, wherein the cells are arranged in a grid pattern, each cell being located at the intersection of one of the first set of channels and one of the second set of channels.

3. The tile system according to claim 1, further comprising a cable clip having two end portions that fit into respective cells on the underside of the tile and, between the two end portions, a bridge portion that spans at least one intermediate cell to secure a cable in one of the channels that passes through the intermediate cell.

4. The tile system according to claim 1, wherein the tile comprises two tile parts, further comprising a junction clip having two end portions that fit into respective cells on the undersides of the two tile parts and, between the two end portions, a bridge portion that spans a junction between the two tile parts to secure the two tile parts together.

5. The tile system according to claim 1, further comprising a lighting cable that carries a plurality of lighting elements at intervals along the lighting cable, the intervals being such that, when the lighting cable is located in one of the channels on the underside of the tile, the lighting elements are aligned with respective cells of the tile.

6. The tile system according to claim 1, wherein the projections are in adjacent pairs, the bosses of the adjacent projections being joined to one another.

7. The tile system according to claim 1, wherein the flexure of each projection is S-shaped, whereby the flexure can flex in a plane parallel to the upper surface of the tile.

8. The tile system according to claim 1, wherein the boss of each projection comprises a screw-hole, through which the tile can be secured to a substrate.

9. The tile system according to claim 1, further comprising a plurality of inserts;
   wherein the upper surface of the tile comprises a plurality of recesses; and
   wherein the recesses and the inserts comprise co-operating parts, by which the inserts are retained in the recesses.

10. The tile system according to claim 9, wherein each of the recesses in the upper surface is aligned with one of the cells on the underside of the tile.

11. A tile system comprising:
    a tile having an upper surface, an underside and a plurality of side edges; and
    a plurality of inserts;
    wherein:
      the upper surface contains a plurality of recesses for receiving the inserts;
      the recesses and the inserts comprise co-operating parts, by which the inserts are retained in the recesses; and
      the underside of the tile comprises a plurality of channels parallel to the upper surface, ends of the channels opening at side edges of the tile;
    characterized in that:
      the plurality of channels comprise a first set of channels that extend between one pair of opposite side edges of the tile and a second set of channels that extend between a second pair of opposite side edges of the tile.

12. The tile system according to claim 11, wherein each recess comprises a lower wall defining a hole and each insert comprises a pair of resilient arms, each arm bearing a hook, whereby the arms can be deformed towards one another to pass through the hole and can then spring apart such that the hooks engage behind the lower wall.

13. The tile system according to claim 11, wherein the plurality of recesses occupy substantially the whole area of the upper surface of the tile.

14. The tile system according to claim 13, wherein the plurality of recesses are arranged in a grid pattern.

15. The tile system according to claim 11, further comprising a lighting cable that carries a plurality of lighting elements; the lighting cable being capable of location in at least one of the channels such that the lighting elements are aligned with recesses of the tile.

16. The tile system according to claim 15, wherein at least some of the inserts are translucent for insertion into recesses that are aligned with the lighting elements.

17. A tile system according to claim 11, wherein the underside of the tile comprises a plurality of cells aligned with the recesses on the upper side of the tile, adjacent cells being interconnected to form the channels.

18. A method of assembling a tile system that comprises at least one tile having an upper surface, an underside and a plurality of side edges, wherein:
    the underside of the tile comprises a plurality of cells, adjacent cells being interconnected to form a plurality of channels parallel to the upper surface;
    the channels open away from the upper surface of the tile and at least some of the channels end in openings at the side edges of the tile;
    a first set of the channels extends between one pair of opposite side edges;
    a second set of channels extends between a second pair of opposite side edges; and
    at least one of the side edges comprises a projection comprising a flexure that extends from the side edge of the tile and terminates in a boss;
    the method comprising:
      arranging a cable in one or more of the channels; and
      laying the tile on a substrate next to an adjacent, similar tile such that the flexure extends into an opening at a side edge of the adjacent tile, and the boss fits into a cell on the underside of the adjacent tile to secure the tile to the adjacent tile.

19. A method according to claim 18, wherein the cable is a lighting cable that carries a plurality of lighting elements at intervals along the lighting cable, wherein the step of arranging the cable in one or more of the channels comprises aligning the lighting elements with respective cells of the tile.

20. A method according to claim 18, wherein the upper surface of the tile contains a plurality of recesses, the method comprising the further step of pressing a plurality of inserts into the recesses to engage with and be retained by the recesses.

* * * * *